US006169932B1

(12) United States Patent
Nunes

(10) Patent No.: US 6,169,932 B1
(45) Date of Patent: Jan. 2, 2001

(54) AUTOMATED PRODUCTION OF INSTRUMENT FACES AND INSTRUMENTS

(76) Inventor: Brendon G. Nunes, 467 Westney Road, South, Unit 3, Ajax, Ontario (CA), L1S 6V7

( * ) Notice: Under 35 U.S.C. 154(b), the term of this patent shall be extended for 0 days.

(21) Appl. No.: 09/136,969

(22) Filed: Aug. 20, 1998

Related U.S. Application Data

(63) Continuation of application No. 08/071,008, filed on Jun. 2, 1993, now Pat. No. 5,818,717.

(51) Int. Cl.[7] ..................... G06F 19/00; G03G 13/01

(52) U.S. Cl. ..................... 700/117; 700/127

(58) Field of Search ..................... 700/117, 127; 399/295; 430/42, 126

(56) References Cited

U.S. PATENT DOCUMENTS

| | | | | |
|---|---|---|---|---|
| 3,817,022 | * | 6/1974 | Swartz | 368/67 |
| 4,022,015 | * | 5/1977 | Bailey | 368/40 |
| 4,725,511 | | 2/1988 | Reber | 428/620 |
| 4,755,835 | * | 7/1988 | Ogihara et al. | 346/82 |
| 5,062,666 | * | 11/1991 | Mowry et al. | 283/67 |
| 5,380,206 | * | 1/1995 | Asprey | 434/257 |
| 5,818,717 | * | 10/1998 | Nunes | 700/117 |
| 5,842,574 | * | 12/1998 | Nunes | 206/575 |
| 6,109,583 | * | 8/2000 | Nunes | 248/346.11 |

OTHER PUBLICATIONS

Sweda Custom Imprinted Design Manual, vol. IV, 1993, three pages.

Sweda Elegance in Time catalog, 1992–1993, two pages.

* cited by examiner

*Primary Examiner*—Paul P. Gordon
(74) *Attorney, Agent, or Firm*—Nixon & Vanderhye P.C.

(57) ABSTRACT

A method of producing an instrument face having functional indicia thereon (such as a clock face dial, thermometer face, etc.), allows-high quality, multicolor instrument faces to be produced in a cost effective manner even for small runs (e.g. 1–500 units). The instrument face is created in a computer in electronic format, and the computer transmits electronic signals to a color photocopier, to control it to print the instrument face on a sheet of paper. The sheet of paper may be laminated to a more rigid sheet, e.g. styrene, cardboard, acrylic or plexiglass, and then an instrument face of the appropriate geometric shape and size is cut from the sheet material. The face is assembled with other functional components to produce an operable instrument. The cutting is preferably practiced automatically utilizing a laser cutter under the control of the computer. A scanner or CD ROM may be utilized for inputting data into the computer. A simplified version may be practiced by overlaying a transparency with instrument dial indicia on a color photograph, and color photocopying it, then laminating, cutting, and assembling it into an instrument.

16 Claims, 5 Drawing Sheets

FIG. 1
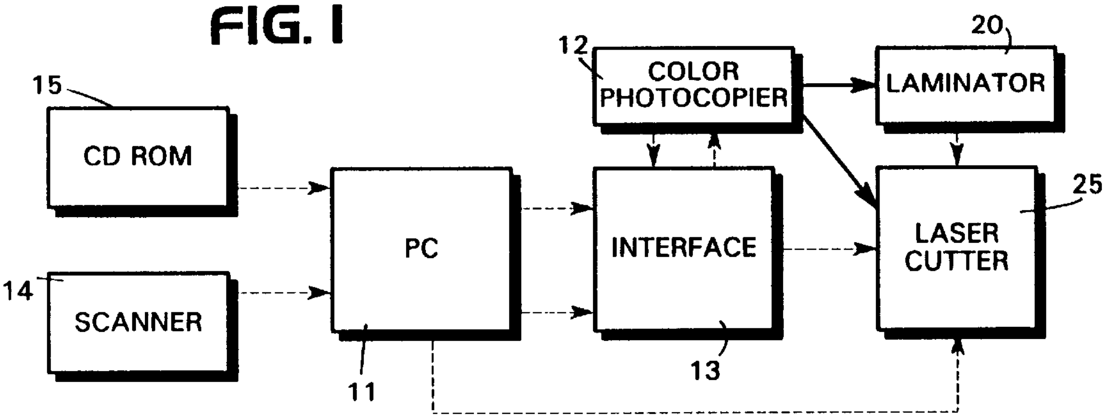
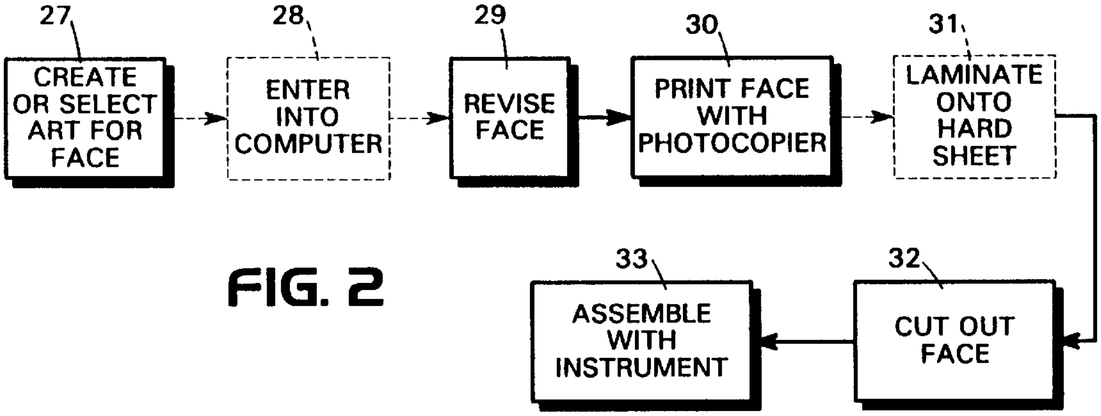
FIG. 2

FIG. 4
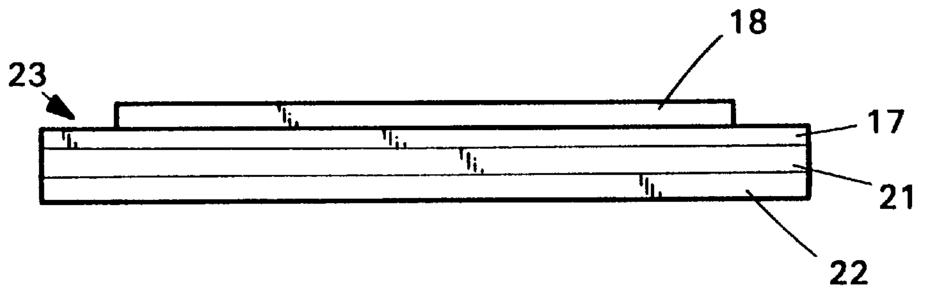
FIG. 6
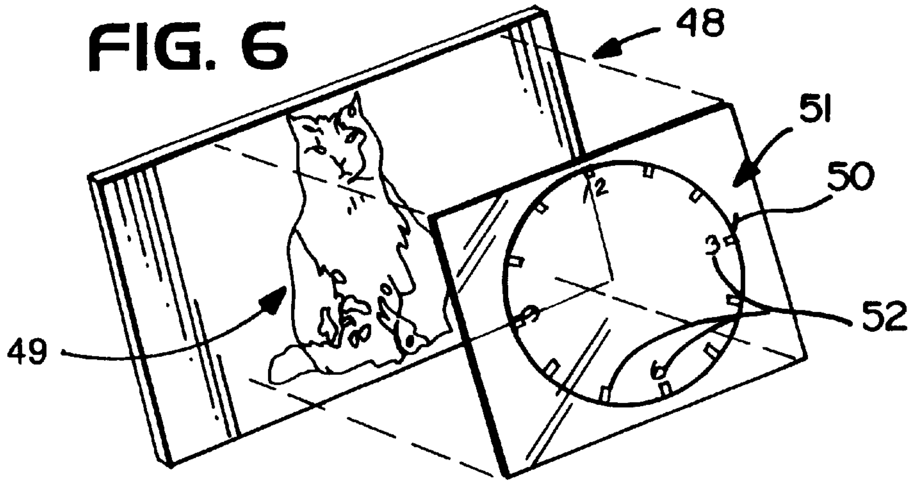
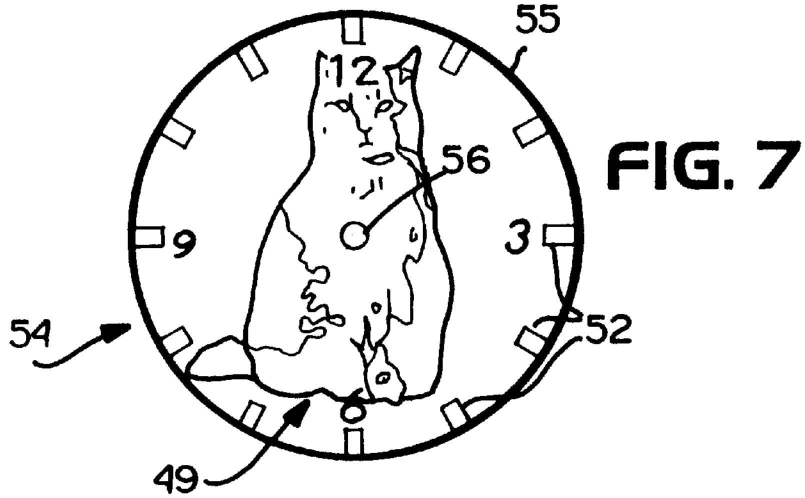
FIG. 7

AUTOMATED PRODUCTION OF INSTRUMENT FACES AND INSTRUMENTS

This is a continuation of application Ser. No. 08/071,008, filed Jun. 2, 1993, now U.S. Pat. No. 5,818,717 Oct. 6, 1998.

BACKGROUND AND SUMMARY OF THE INVENTION

There are many organizations and individuals who want small quantities of specially faced instruments, such as clocks, thermometers, air speed indicators, barometers, and the like. However there presently does not exist a cost effective technique for producing small volumes of customized instrument faces in a quick and high quality manner, especially if a multicolor face is desired. Attempts have been made to produce instrument faces electronically using a high quality color printer. While clock faces produced in that manner have impressive aesthetics, a slow print speed and ink fading when exposed to sunlight made such a method of producing custom clock dials impractical. Also, it was difficult to quickly and conveniently cut out the clock dial, utilizing a knife.

Traditional methods of producing high quality multicolored instrument faces are not applicable to small volumes (e.g. between 1 and 500 units) because of the large set up costs. Using traditional screen printing methods, a screen must be made to print each color. After printing the instrument faces have to be die cut on a large press using a steel rule die, having large set up costs and usually involving significant amounts of waste.

According to the present invention, a method and apparatus are provided which allow the cost effective production of multicolor instrument faces of high quality, and in small runs. While the invention is particularly applicable to the production of functional multicolor instrument faces, having numerical and other indicia thereon, it is also applicable to the production of other functional multicolor elements, which can be used to produce a functioning object. All of the apparatus necessary for practicing the invention is off the shelf equipment, but it is configured in a unique manner according to the present invention to solve a long standing problem in the art.

According to one aspect of the present invention apparatus for producing multicolor instrument faces is provided. The apparatus comprises the following elements: A computer. A color photocopier or like color printer. Interface means for controlling the color photocopier with the computer to effect printing of a multicolor instrument face on a sheet of paper from electronic signals transmitted to the color photocopier from the computer. And automatic cutting means operatively connected to the computer for cutting an instrument face shape from a sheet of paper on which it has been printed by the color photocopier. The automatic cutting means preferably comprises a laser cutter. Also, there preferably is provided a laminator for laminating a sheet of paper on which an instrument face is printed to a sheet of more rigid material. A scanner or CD ROM may also be provided for inputting data into the computer.

Utilizing the apparatus described above, a method producing an instrument face having functional indicia thereon is provided. The method comprises the following steps: (a) Creating the instrument face with functional indicia thereon in the computer in electronic format. (b) Under the control of the computer, transmitting electronic signals from the computer to the printer (e.g. color photocopier) to control the printer to print the instrument face with functional indicia on a piece of sheet material. And (c) cutting the appropriate shape and size of the instrument face from the piece of sheet material on which it is printed.

The method also preferably comprises the further step of assembling the instrument face with other functional components, such as clock hands and a clock movement, to produce an operable instrument having a face with functional indicia thereon. Step (c) is typically practiced automatically, using a laser cutter. Step (b) may be practiced to print the instrument face on a sheet of paper and then there is the further step (d), between steps (b) and (c), of laminating the sheet of paper onto a piece of more rigid material, such as acrylic or plexiglass if self-supporting, or these materials or styrene or cardboard if it is to be mounted in a casing. Numerical indicia may be part of the functional indicia, in multiple colors, on the instrument face, and the method may be employed as to produce 1–500 instrument faces of a particular type in a cost effective manner.

More generally, the invention relates to a method of constructing a functional multicolor element having indicia thereon utilizing a computer and a color photocopier. The method comprises the following steps: (a) Electronically creating or providing in the computer an electronic simulation of the desired functional multicolor element, with indicia thereon. (b) Under the control of the computer, transmitting electronic signals from the computer to the photocopier so that the photocopier transforms the electronic simulation of the desired functional multicolor element onto a piece of sheet material. And (c) using the functional multicolor element with other elements to produce a functioning object.

There is also typically the further step (d), between steps (b) and (c), of cutting the sheet material into a different shape containing substantially only the functional multicolor element, and step (d) is typically practiced automatically under the control of the laser cutter. The steps (a) and (b) may be practiced to produce an instrument face which is assembled with mechanical and electrical components at the instrument to produce an operable instrument with mutlicolor functional instrument. face, such as clock, thermometer, air speed indicator, altimeter, barometer, horizon indicator, etc. Other functional objects that could be created according to the invention include customized plaques, trophies, or like awards.

A simplified procedure for making multicolor instrument faces can be employed if a color photograph (as is, or doctored, as with an air brush) is used to provide the basis for the artwork on the instrument face. In this case the method comprises the following steps: (a) Superimposing functional indicia for an instrument face on a transparent substrate over the color photograph. (b) Copying the color photograph with superimposed functional indicia, using a color photocopier, onto a sheet of paper. (c) Laminating the sheet of paper to a piece of sheet material more rigid than the piece of paper to provide a laminate; and (d) cutting the instrument face out of the laminate. Step (b) is typically practiced to simultaneously enlarge or reduce the photograph with superimposed functional indicia when making the copy on the sheet of paper to insure the proper size for the instrument face.

The invention also may be used to produce self-supporting instruments. That is, the instrument face itself provides the support for the instrument (rather than being mounted in a casing), either the sheet material on which photocopying has been practiced, or more typically a piece of acrylic or plexiglas to which that sheet is laminated.

According to this aspect of the present invention a method is provided comprising the following steps: (a) Making a color copy of a geometric design having functional instrument indicia thereon, and at least one color besides black and white, on a piece of paper. (b) Laminating the piece of paper on a piece of rigid, self supporting material with the functional indicia facing outwardly, to provide a laminate. (c) Cutting the geometric design from the laminate to form a self-supporting design element comprising the instrument face and back, the face having the functional indicia thereon; and (d) connecting the mechanism to back of the self-supporting design element, with the indicator visible on the front of the design element and cooperating with the functional indicia on the instrument face. The geometric design may be an irregular geometric design, and the instrument may be a clock and the at least one functional moving indicator at least an hour hand and a minute hand.

It is the primary object of the present invention to cost effectively produce high quality, even multicolor, instrument faces in short runs. This and other objects of the invention will become clear from inspection of the detailed description of the invention and from the appended claims.

BRIEF DESCRIPTION OF THE DRAWINGS

FIG. 1 is a control schematic illustrating the various pieces of apparatus for the practice of the present invention;

FIG. 2 is a schematic diagram illustrating the various steps that may be utilized to practice the method according to the present invention;

FIG. 4 is a side view, with the components greatly exaggerated in thickness for clarity of illustration, of the sheet of paper FIG. 3 after it has been laminated to a more rigid sheet;

FIG. 6 is a perspective view illustrating matching of a transparent material with instrument indicia thereon with a color photograph for the practice of a simplified method of producing instrument faces according to the invention;

FIG. 7 is a front view of an instrument face made utilizing the components of FIG. 6, according to the invention;

DETAILED DESCRIPTION OF THE DRAWINGS

Figure 3:
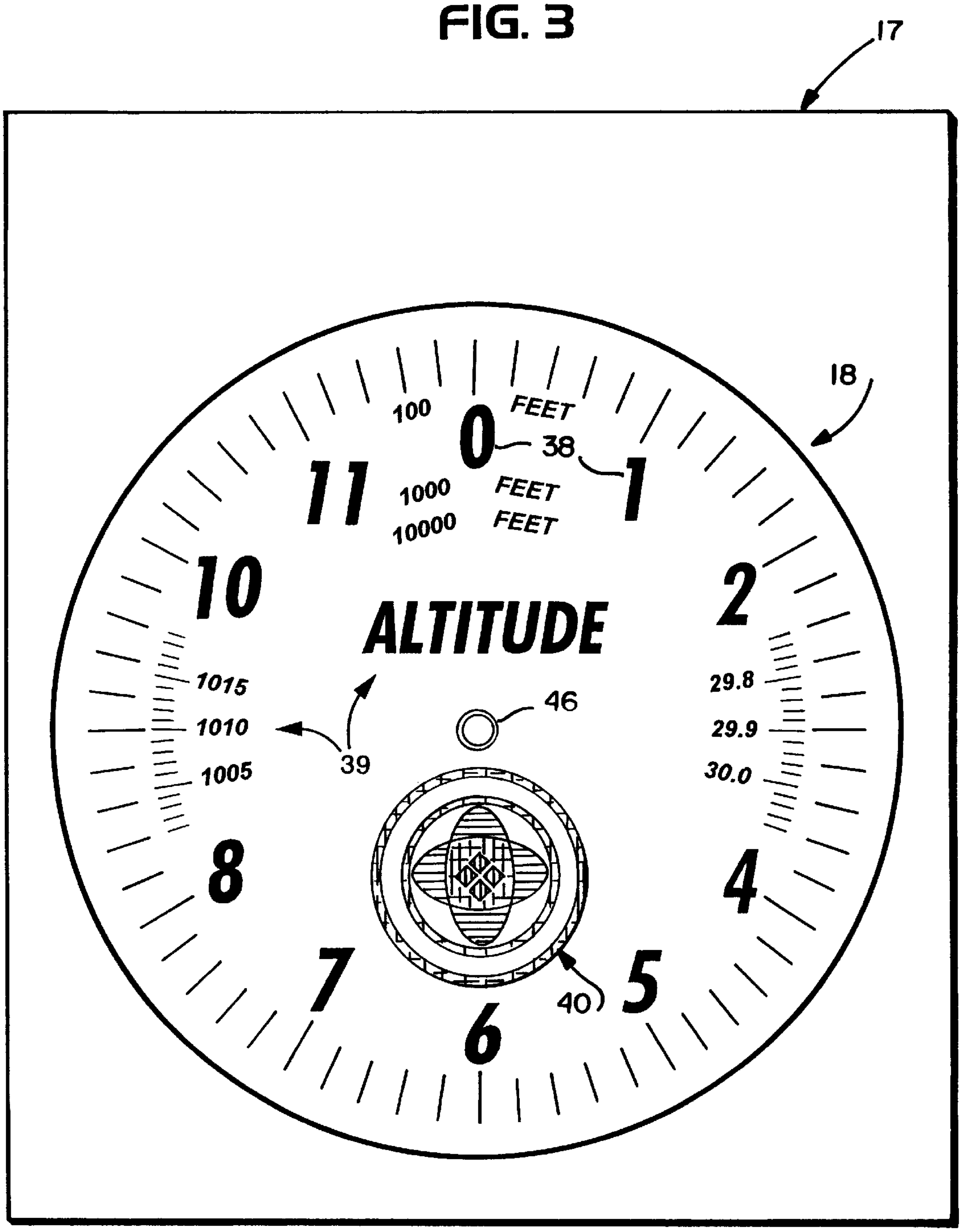
FIG. 3 is a top plan view of an exemplary sheet of paper printed with an instrument face utilizing the apparatus of FIG. 1 according to the method of FIG. 2.

Exemplary apparatus according to the present invention is schematically illustrated in FIG. 1, with the dotted line arrows between components indicating electronic controller feed, while the solid lines indicate movement of tangible objects.

One of the most basic components of the apparatus of FIG. 1 is a computer 11. The computer 11 preferably is an IBM PC or an Apple PC, although a wide variety of other computers may be utilized. A second major component of the apparatus of FIG. 1 is a printer, preferably a color photocopier 12. Exemplary color photocopiers that may be utilized with success to achieve the desired results according to the invention are a Canon CLC-300 color laser photocopier, a Canon CLC-500, a Kodak 1550, a Kodak 1525, and a Xerox 5775. In order for the PC 11 to properly control the color photocopier 12, a suitable interface/controller 13 must be provided. One suitable interface 13 for Canon photocopiers is a Canon PS-IPU; another, generic, interface is a Fiery controller, or a Fiery LITE controller, both made by EFI.

The artwork that will be used to create the instrument face, with functional indicia thereon, is created in electronic format in the computer 11. Information may initially be inputted into the computer 11 for this purpose from a conventional scanner 14 or a CD ROM 15. Typical commercially available software programs which may be utilized in the computer 11 in order to produce almost any design desired on an instrument face include CORELDRAW (combined with Micrographics Picture Publisher to do photoediting), HARVARD DRAW, MICROGRAPHICS DESIGNER, VENTURA DESKTOP PUBLISHING, QUARK EXPRESS, or ALDUS PAGEMAKER. The appropriate electronic version of the instrument face is electronically transmitted from the computer 11 software through the interface 13 to the color photocopier 12, and is printed out on a sheet of paper, or if desired and practical for a particular situation, a slightly heavier sheet material.

After an instrument face has been printed out on a sheet of paper with the photocopier 12 (e.g. see the sheet of paper 17 in FIG. 3, with the instrument face—clock dial 18—thereon) may be laminated onto a more rigid piece of material which may serve as the base for the instrument itself, or be combined with other casing components. A typical other piece of material that may be utilized is a sheet of styrene, cardboard, acrylic, or plexiglass if the instrument face produced is to be mounted in a casing (e.g. FIG. 5), or acrylic or plexiglass if it will be self-supporting (e.g. FIG. 10). A laminator 20 for performing the laminating function may be of any suitable conventional type. FIG. 4 schematically illustrates the sheet 17 of FIG. 3, having the toner or ink making up the clock dial illustrated at 18, laminated with adhesive 21 onto a piece of more rigid material (e.g. styrene) 22, the various components illustrated greatly exaggerated in thickness for clarity of illustration.

After laminating to produce the laminate 23 (see FIG. 4), or if lamination will not be employed, utilizing just the sheet 17, the instrument face 18 is cut out. That is, face 18 is separated from the rest of the sheet material 17, 22. This is preferably accomplished automatically, utilizing a laser cutter 25. One particular laser cutter that may be utilized for this purpose is made by Universal Laser Systems, Inc. of Scottsdale, Arizona, Model #ULS, containing a twenty five watt carbon dioxide laser. In general, the smallest and least expensive laser cutter 25 that will cut the particular material that will be supplied should be selected. The laser cutter 25 may be controlled directly by the PC 11, or through the interface 13, as necessary for the particular components selected.

FIG. 2 schematically illustrates an exemplary method according to the present invention. The first box 27 indicates that the artwork for the instrument face is created or selected. If the creation or selection is external of the computer aa, rather than created within the computer itself by a suitable software package such CORELDRAW, it is then entered into the computer as indicated by the dotted line box 28 in FIG. 2, such as utilizing a scanner 14 or a CD ROM 15. Ultimately, within the computer 11—indicated by box 29—the instrument face, in electronic format, is revised, and once it is in an appropriate form, an electronic control signal is sent from the PC 11, through the interface 13, to the color photocopier 12 to print the desired number of copies (e.g. 1–500) of instrument faces typically on sheets of paper, as indicated by box 30.

After printing out the paper sheets with the multicolor instrument dials thereon, the sheets may be laminated—indicated by optional box 31—to a more rigid sheet, an then ultimately they are cut to the correct geometric shape (e.g. circle, octagon, etc.) and size of the instrument face, as indicated at 32 in FIG. 2. Then the instrument face is assembled with the ultimate instrument to be produced, as indicated at box 33. Typically, the face is assembled with hands, movements, casings, and other mechanical or electrical elements, to produce the final operable instrument.

Figure 5:
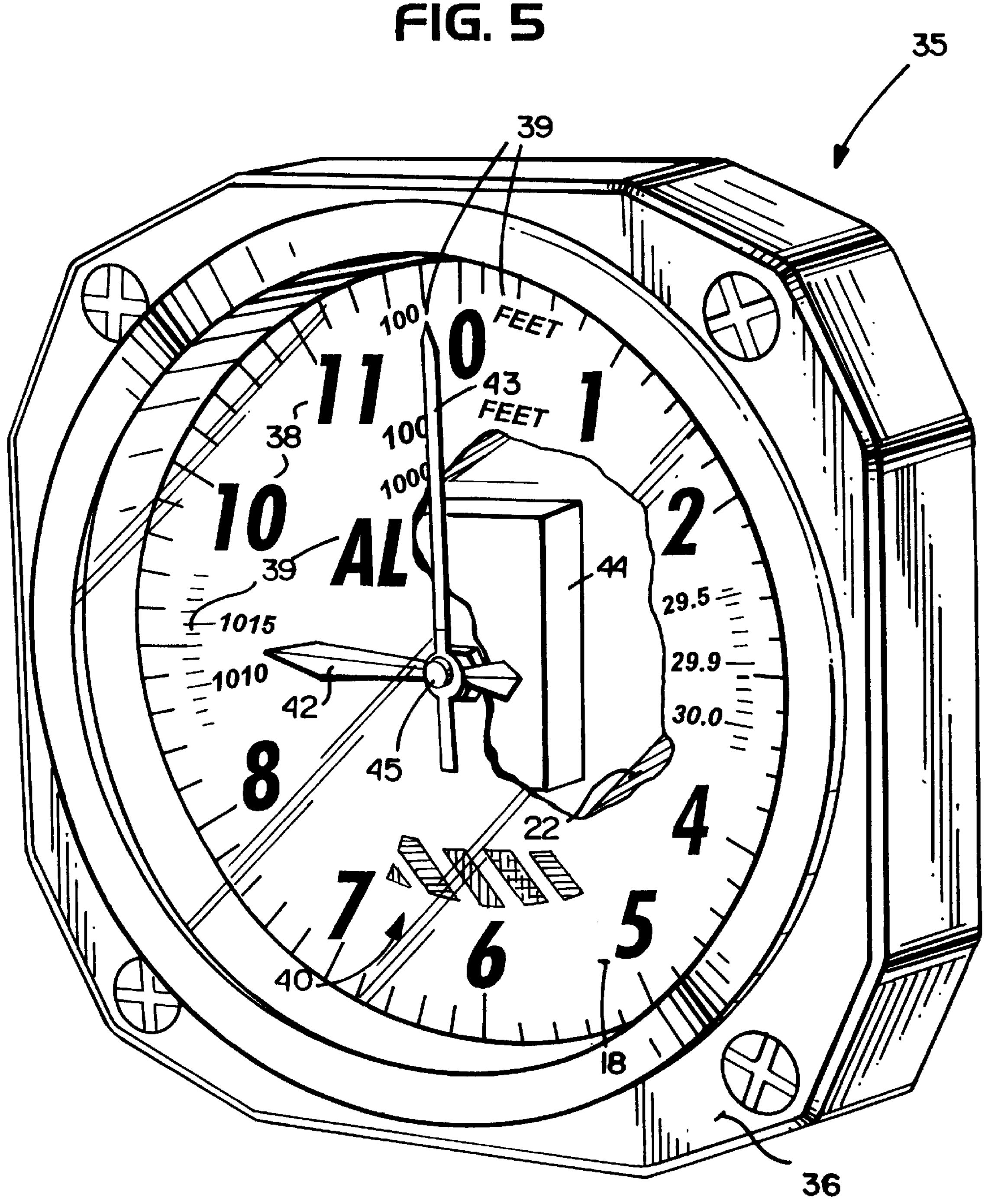
FIG. 5 is a front perspective view, with portions cut away for clarity of illustration, of the instrument face of FIG. 3 shown in an assembled instrument (clock)

In one exemplary procedure according to the invention, e.g. for making an instrument such as illustrated in FIG. 5, the sheet of paper 17 from printer (e.g. photocopier) 12 is affixed to a piece of styrene 22 about 0.02–0.03 inches thick, having a suitable adhesive 21 (typically used for silk screening), such as Decochem UV photoboard acrylic adhesive, on one face thereof, e.g. covered by a release sheet. The release sheet is removed from the styrene 22, and then the sheet 17 is pressed into contact with the adhesive 21 by hand, and perhaps lightly rolled, forming the laminate 23 (see FIG. 4). The laminate 23 is then used with the laser cutter 25 to produce a clock dial, which is then secured by another adhesive to a blank face of a hard plastic clock, the styrene isolating the art work on paper 17 from the adhesive securing the dial 18 to the clock casing.

FIG. 5 illustrates an exemplary instrument, shown generally by reference numeral 35, produced according to the invention. In this particular case, the instrument face 18 has been laminated to a 0.02 inch thick styrene sheet 22 (if the face 18 is printed onto cardboard, the more rigid sheet 22 is not necessary), and it is placed within the plastic casing 36 and secured thereto, e.g. with adhesive. In this particular case, the instrument face 18 has numerical functional indicia thereon, in this case the hour symbols of a clock. Also, various decorative indicia are also provided, in this case the clock face simulating an altimeter, and therefore having the nonfunctional but decorative indicia such as 39. Also, a unique logo or design is provided as indicated generally by reference numeral 40, and the design 40 (as well as the other printed indicia 38, 39 or the background therefor, if desired) is multicolored. For example, the colors yellow, blue, and red are indicated for the design 40 in FIG. 5 by suitable hatching/stippling.

The instrument 35 also comprises operable mechanical and electrical components, including the hour hand 42, minute hand 43, and clock movement 44, which is mounted to the back of the sheet 22 in a conventional manner, and has a shaft 45 extending outwardly through a central opening 46 in the face 18 so as to provide for movement of the clock hands 42, 43.

While a clock is illustrated at 35 in FIG. 5, the invention is applicable to virtually any type of instrument, including thermometers, altimeters, barometer, air speed indicators, horizon indicators, etc. Also while a circular instrument face 18 has been illustrated, it need not be circular but can be any polygonal shape, or even an geometric irregular shape since the laser cutter 25 can cut almost any shape that the computer 11 can generate. Also, while the invention is particularly applicable to instrument faces (dials), it may also be utilized to create other functional multicolor elements having indicia thereon, including trophies, plaques, or other aesthetic structures that are attached to or incorporated in otherwise functional objects, such as machines, appliances, and the like.

The invention has been actually practiced to cost effectively produce a wide variety of clock and thermometer dials having unique artwork and designs thereon. The cost of producing instrument dials according to the invention is only about 10–50% greater than producing instrument dials by conventional mass production techniques despite the face that the invention produces the instrument faces in small quantities (typically 1–500 units). The instrument faces are also of extremely high quality, long-lasting, and allow uniquely designed instruments or the like to be produced in a matter of hours.

Figure 8:
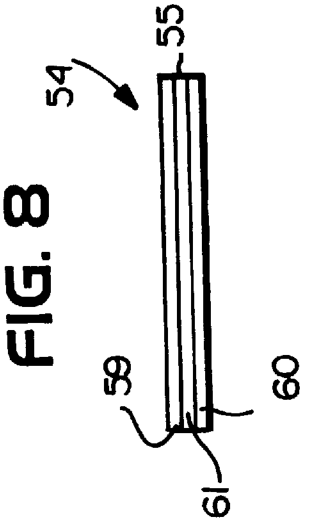
FIG. 8 is a schematic side view of the face of FIG. 7 with the components greatly exaggerated in thickness for clarity of illustration.

According to a simplier method, the invention can be practiced to make instrument faces directly from color photographs (e.g. prints), either untouched, or modified (e.g. by using an airbrush). As seen in FIGS. 6–8, a transparent substrate (e.g. plastic, such as Mylar) 50 with an instrument face 51 inked thereon, having functional indicia 52, is superimposed on a color photo 48 with a physical object or being 49 illustrated thereon. The substrate 50 may be held in place with transparent tape. It is then photocopied with a color photocopier, such as of the types earlier described, and normally will be enlarged (or sometimes reduced) in size so as to produce an instrument dial of desired size.

The piece of paper on which the photocopy is produced may then be laminated and laser cut, as described above with respect to FIGS. 1 and 2, to produce the instrument face 54 (FIG. 7), having the same object or being 49 as the photo 48. The instrument face 54 has a circumferential periphery 55 defined by the cutter, and a central hole 56. As seen in FIG. 8, typically the face 54 comprises a laminate, a top sheet of paper 59 having the color representation 49 thereon, a substrate 60 (e.g. styrene, cardboard, acrylic, plexiglas, etc.), and adhesive 61 holding them together.

Figure 10:
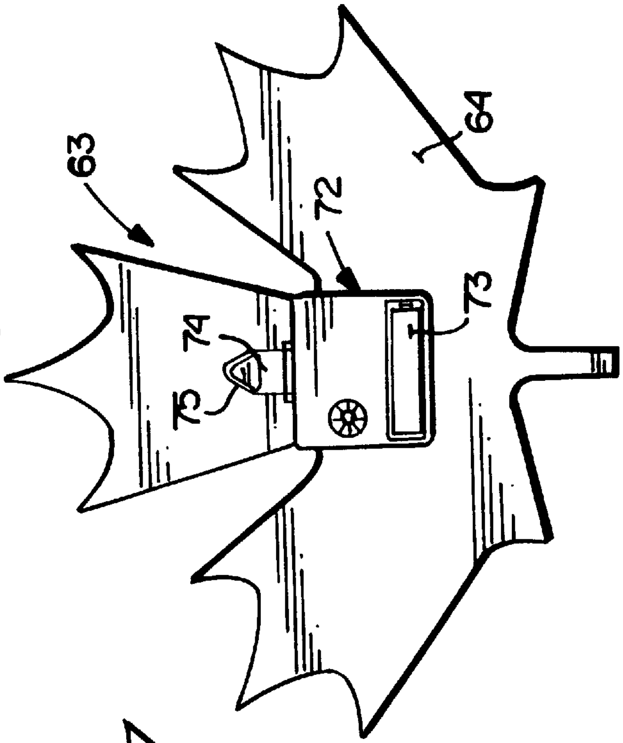
FIG. 10 is a rear view of the clock of FIG. 9.
Figure 9:
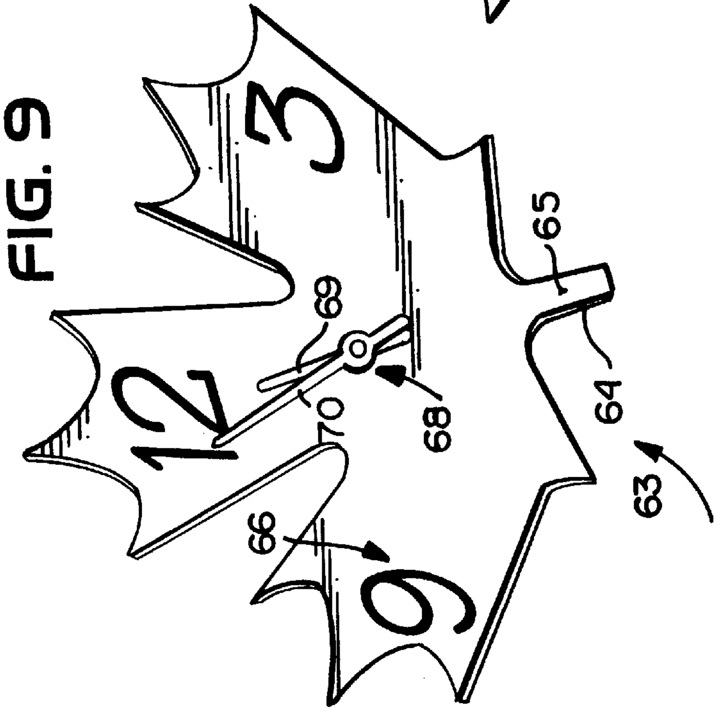
FIG. 9 is a front perspective view of a self-supporting clock face produced according to another exemplary method according to the invention.

FIGS. 9 and 10 illustrate an instrument 63 according to the invention in which the face is self-supporting, there being no requirement for a casing, such as illustrated in FIG. 5. Here, a rigid substrate 64 (e.g. plexiglas or acrylic) has a colored paper sheet made as described in any of the above described methods, laminated on the front thereof, having functional indicia 66. The instrument 63 includes at least one functional moving indicator 68, such as the clock minute and hour hands 69, 70, respectively (FIG. 9) visible on the front and cooperating with indicia 66. The instrument electrical and mechanical components (e.g. clock movement) 72 are mounted on the rear of the sheet 64 (FIG. 10), and may include a power source (e.g. battery) 73, and a mounting flange 74 with a mounting opening 75 therein. Opening 75 may be received by a hook or nail in a wall, or the like, supporting the geometrically shaped laminate 64, 65 so that the instrument 63 is readily visibly.

While the invention has been herein shown and described, no one has presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and apparatus.

What is claimed is:

1. A method of producing an instrument face having functional indicia thereon, utilizing a computer and printer, comprising the steps of:

(a) creating the instrument face with functional indicia thereon in the computer in electronic format;

(b) under the control of the computer, transmitting electronic signals from the computer to the printer to control the printer to print the instrument face with functional indicia on a piece of sheet material; and (c) cutting the appropriate shape and size of the instrument face from the piece of sheet material on which it is printed.

2. A method as recited in claim 1 wherein step (c) is practiced automatically, using a laser cutter.

3. A method as recited in claim 1 wherein step (b) is practiced to print the instrument face on a sheet of paper; and comprising the further step (d), between steps (b) and (c), of laminating the sheet of paper onto a piece of more rigid material.

4. A method as recited in claim 1 wherein the printer is a color photocopier, and wherein steps (a)–(c) are practiced to produce a multicolor instrument face with functional indicia thereon.

5. A method as recited in claim 4 wherein steps (a)–(c) are practiced to provide numerical indicia as the functional indicia on the instrument face, and to produce 1–500 instrument faces of a particular type.

6. An instrument face made according to the method of claim 1.

7. A method of producing a clock face having time indicia thereon, utilizing a computer and a color printer, comprising:

(a) electronically creating or providing a clock face with time indicia thereon in the computer in an electronic format;

(b) under the control of the computer, transmitting electronic signals from the computer to the printer to control the printer to print a multicolor clock face with time indicia on a piece of sheet material; and (c) cutting the appropriate shape and size of the multicolor clock face from the piece of sheet material on which it is printed.

8. A method as recited in claim 7 wherein step (c) is practiced automatically, using a laser cutter.

9. A method as recited in claim 7 wherein step (b) is practiced to print the clock face on a sheet of paper; and comprising the further step (d), between steps (b) and (c), of laminating the sheet of paper onto a piece of more rigid material.

10. A method as recited in claim 7 wherein the printer is a color photocopier, and wherein steps (a)–(c) are practiced to produce a multicolor clock face with functional indicia thereon.

11. A method as recited in claim 10 wherein steps (a)–(c) are practiced to provide numerical indicia as the functional indicia on the clock face, and to produce 1–500 instrument faces of a particular type.

12. A clock face made according to the method of claim 7.

13. A method of producing an instrument including an instrument movement operatively connected to a shaft, an instrument face with an opening for receipt of the shaft, one or more instrument hands, and an instrument casing, using a computer and a color printer, comprising the steps of:

(a) electronically creating, or providing, in the computer the instrument face in electronic format;

(b) under the control of the computer, transmitting electronic signals from the computer to the color printer to control the color printer to print a multicolor instrument face on a piece of sheet material;

(c) forming the appropriate shape and size of the instrument face from the piece of sheet material on which it is printed, and the opening for passage of the shaft therethrough; and (d) assembling the instrument face and casing, and passing the shaft of the instrument movement through the hole, and attaching the one or more instrument hands on the shaft, to produce an instrument with functional indicia.

14. A method as recited in claim 13 wherein the instrument is a clock, and the instrument face is a clock face, and the at least one instrument hand comprises at least two clock hands, and wherein (a) through (d) are practiced so as to produce an operating clock with functional indicia.

15. A method as recited in claim 14 wherein (a) and (b) are practiced to form functional indicia on the clock face, and print the functional indicia on the clock face.

16. A method as recited in claim 13 wherein (a) and (b) are practiced to form functional indicia on the instrument face, and print the functional indicia on the instrument face.

* * * * *